United States Patent [19]

Weber

[11] Patent Number: 5,339,561
[45] Date of Patent: Aug. 23, 1994

[54] DIRECTIONAL DIVING DEVICE FOR TROLLING

[76] Inventor: Russell W. Weber, 6120 W. Port Ave., Milwaukee, Wis. 53233

[21] Appl. No.: 131,071

[22] Filed: Oct. 1, 1993

[51] Int. Cl.⁵ .............................................. A01K 91/00
[52] U.S. Cl. ................................................ 43/43.13
[58] Field of Search ................. 43/43.13, 43.12, 42.22, 43/9.7

[56] References Cited

U.S. PATENT DOCUMENTS

| | | | |
|---|---|---|---|
| 2,062,718 | 12/1936 | Kallberg | 43/43.13 |
| 3,568,355 | 3/1971 | Hassell | 43/43.13 |
| 3,643,370 | 2/1972 | Cook et al. | 43/43.13 |
| 3,808,727 | 5/1974 | Flanders | 43/43.13 |
| 3,844,059 | 10/1974 | Weber | 43/43.13 |
| 3,940,872 | 3/1976 | Weber | 43/43.13 |
| 4,212,127 | 7/1980 | Daniels | 43/43.13 |
| 4,254,573 | 3/1981 | Mastropaolo | 43/43.13 |
| 4,486,970 | 12/1984 | Larson | 43/43.13 |
| 4,567,687 | 2/1986 | Even | 43/43.13 |
| 4,581,842 | 4/1986 | Kalberer | 43/43.13 |
| 5,255,467 | 10/1993 | Haskell | 43/43.13 |

*Primary Examiner*—P. Austin Bradley
*Assistant Examiner*—Chuck Y. Mah
*Attorney, Agent, or Firm*—Ryan, Kees & Hohenfeldt

[57] ABSTRACT

A diving sinker has a fin on the top surface of a planing member and a chamber on the bottom of the member. The chamber increases the volume of the diver and, hence, its buoyancy. The chamber is rotatable about the axis of a screw that holds it to the bottom of the planing member so as to move a weighted section in the chamber to gain directional control over the diver as it is being towed through the water from the trolling boat. Space in the chamber that is not occupied by the lead weights is occupied by a rigid foam synthetic resin. The trolling line is fed through the eye at the end of a latching arm and through a slot between two flat surfaces, one of which is movable relative to the other to provide a space or slot between them into which the fishing line may be wedged to secure the diver against sliding on the line. When a fish strikes a lure on the line, the tugging force on the diver raises tension in the line leading to the reel on the boat to thereby unlatch the latch arm and allow the line to withdraw from the slot wherein it is wedged. The line passes through guide holes on the top surface of the planing member which support and allow the diver to slide on the line when the latch arm becomes unlatched and the line withdraws from the slot in which it is wedged to prevent the diver from sliding on the line.

14 Claims, 3 Drawing Sheets

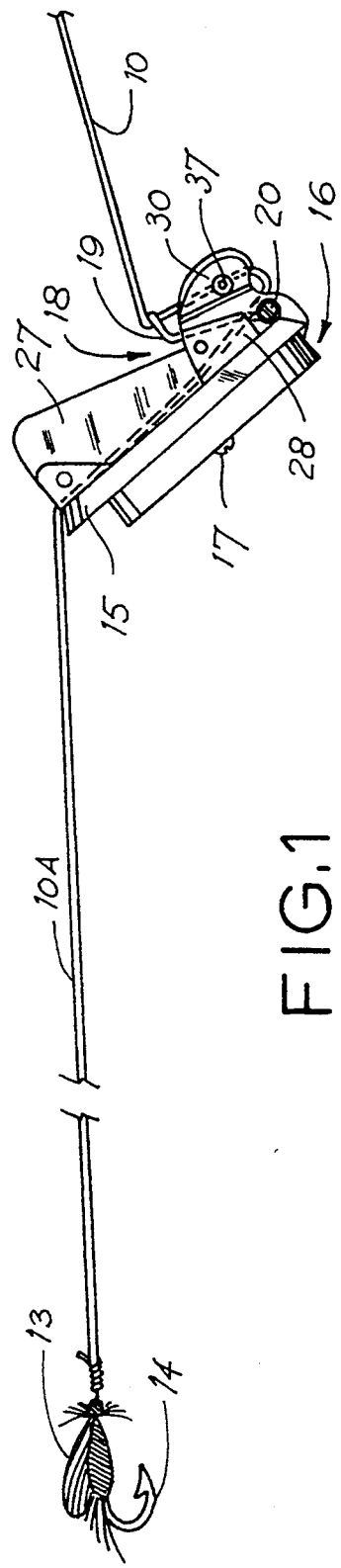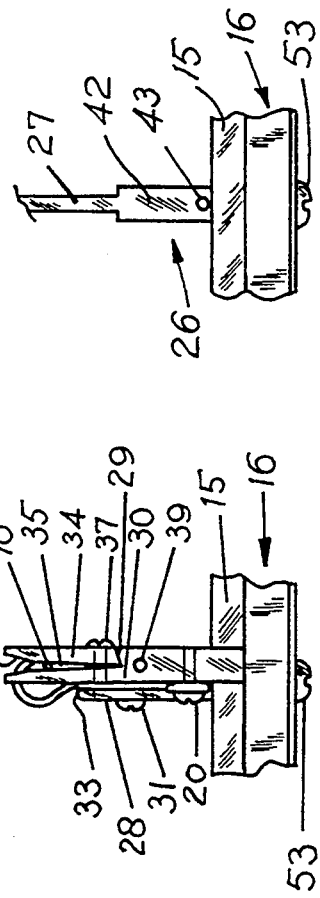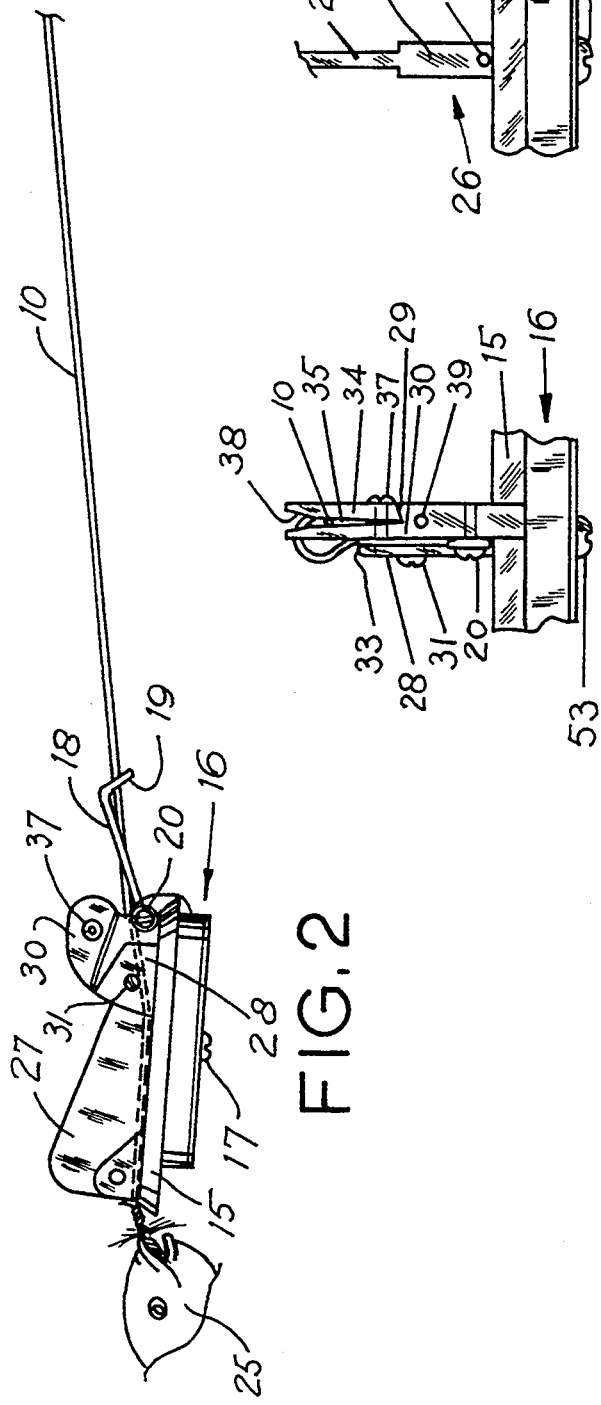

DIRECTIONAL DIVING DEVICE FOR TROLLING

BACKGROUND OF THE INVENTION

The invention disclosed herein pertains to a device that is attached to a fishing line for causing a lure or bait on the end of the line to descend to a predetermined position while trolling for fish.

The basic features of a directional diving device, hereinafter called a diver for the sake of brevity, are disclosed in U.S. Pat. Nos. 3,844,059 and 3,940,872 which are owned by the inventor of the improved diver disclosed herein. The preexisting divers are comprised of a planing member, usually a disk, beneath which a weight is attached. The weight is mounted to the center of the planing member for being rotatable to influence the position of the diver relative to the trolling boat. There is a diametrically extending fin perpendicular to the top surface of the planing member or disk. To use the existing divers, a leader is tied to the trailing end of the planing disk, and the lure is attached to the free end of the leader. A pivotal latching arm is latched at the leading end of the disk in alignment with the fin. The trolling line extending to the fishing rod on the boat is attached to the free end of the latch arm. At the outset, the latch arm is pivoted toward the trailing end of the planing member at an angle where it becomes releasably latched. Since the point at which the trolling line is attached to the latch arm is above the plane of the planing member and is set back from the leading end of the member, the leading end of the diver is angulated downwardly when the fish line is under tension due to the trolling boat moving in the water. Rotating the weight relative to the planing disk causes the water pressure on the fin to push the diver sideways of the boat as well as downwardly. The fin, acting as a rudder, directs the diver where it will station itself in a trolling pattern. The degree of relative rotation and the amount of line released determining its exact position. More lines can then be used from the boat at the most productive depth. A sharp tug on the latch arm such as the strike of a fish or for retrieving the lure causes the arm to unlatch and pivot into coplanar relation with the planing member. Upon this event, there is no longer a component of force for causing the diver to nose down so it planes horizontally through the water for making it easier to be reeled in.

The diver described in U.S. Pat. No. 3,940,872 has been sold and has been widely used throughout the life of the patent. The diver, however, has one disadvantage in that it stays tied in a fixed position on the trolling line. Most of the time, the length of the leader extending from the trailing end of the diver is quite long so that even if the fish pole is raised as high as it can be when the fish has been reeled in and is ready for being retrieved with a landing net, the fish may not be reachable with the net.

U.S. Pat. No. 4,567,687 solves this problem with a diver that is slidable along the trolling line after it is unlatched as a result of tension created in the line by a fish striking the lure. When the diver is unlatched, it can slide back and forth on the line without resistance. It will be evident that if the diver is released for sliding along the trolling line, it will also have to be clamped to the trolling line so it does not slide along the line inadvertently before the latch arm has been released. In the patented diver, the latch arm is made of wire and is configured to provide a pivot. The arm has an eye on one end through which the trolling line is threaded so that when the line is tensed, it unlatches the latch arm. The diver must be prevented from inadvertently sliding along the fishing line before the latch is released. Slipping of the diver on the fishing line is inhibited by a loop or extension on the wire formed latch arm. This loop or extension has the line running under it so that when the latch arm is latched, the loop exerts a transverse force on the line and presses it against the surface of the planing member. The inventor apparently recognized that the intensive force of a wire loop pressed across the fishing line can indent the line and thereby make it more vulnerable to breaking. To minimize this ill effect, the line is fed through a small piece of resilient tubing and the wire loop presses on the tubing to seize or frictionally engage the line within the tube. The tubing is necessary to avoid damage to the line at the point of compression. There are several problems inherent in this system. The continued use of the diver sliding up and down on the fishing line causes the line to cut grooves on the inside of the tube, requiring replacement of the tube. Since the tube is a separate component of the diver, it can easily be lost. Replacement tubes must be available. To eliminate this problem, the inventor has offered an alternative to using the tubing. This involves wrapping the wire loop with a rubber-like compound. This will also present the same problem. With constant use, a groove will occur in the compound and slippage will occur.

SUMMARY OF THE INVENTION

An improvement in the diver disclosed herein is that it prevents the diver from slipping on the trolling line when the latch arm is still latched by gripping the line uniformly over a substantial portion of its length between two flat parallel interfacing surfaces. One surface is stationary and integral with the components of the diver and the other flat surface is movable and there are means for adjusting one surface to vary the slot size between them to accommodate trolling lines of different diameters.

The diver disclosed herein is also improved in respect to its stability. This is achieved by having a buoyant chamber containing the weight, in a separate compartment, and on the underside of the planing member. This creates a counterforce to the weight and tends to hold the chamber or base in a rigid position, which accounts for much finer or more exact adjustment of the trolling position of the diver. The buoyant chamber can be occupied by a non-absorbent material such as polystyrene foam or an enclosed bubble of air. The buoyant chamber can be enlarged to the point where the diver will float such that if the fishing line is broken, the diver can be recovered. Moreover, the floating diver may keep some of the line afloat with it so that most, if not all, of the broken line can be recovered. In addition, the weight, now inside of the buoyant chamber 16 made up in layers, allowing a layer to be removed or added to compensate for slower or faster trolling speeds.

How the foregoing and other features and objectives of the invention are implemented will appear in the ensuing more detailed description of a preferred embodiment of the invention which will now be set forth in reference to the drawings.

DESCRIPTION OF THE DRAWINGS

FIG. 1 is a side elevational view of the diver as it appears when it is being pulled through the water at an angle under the influence of tension in the trolling line;

FIG. 2 shows the orientation of the diver after a fish has struck the lure and the diver is unlatched so it does not dive as the fishing line is reeled in, and the diver is able to slide along the line toward the lure;

FIG. 8 is a fragmentary front elevational view of the diver with background elements thereof omitted; and FIG. 9 is a fragmentary rear elevational view of the diver with some of the elements in the background omitted.

DESCRIPTION OF A PREFERRED EMBODIMENT

Figure 3:
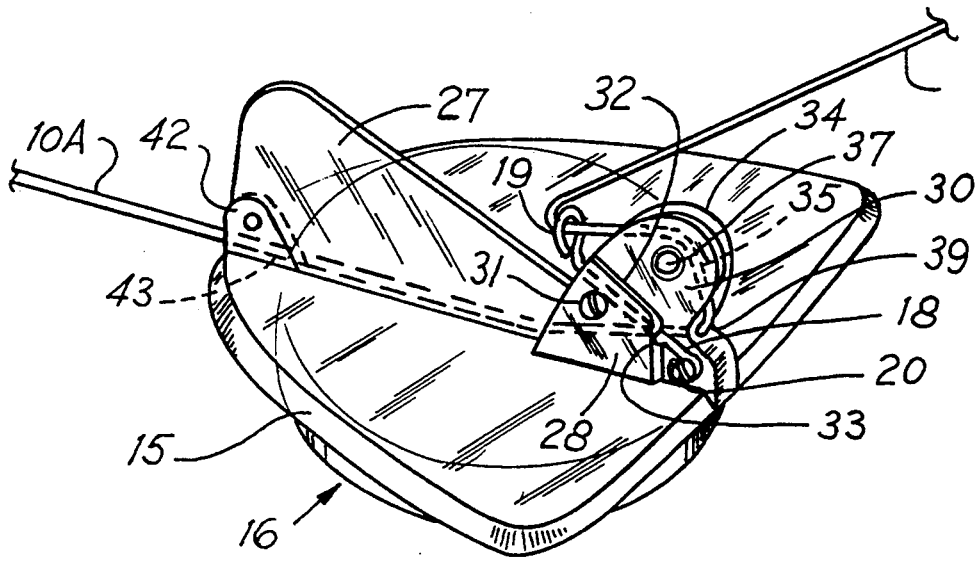
FIG. 3 is a top perspective view of the diver.
Figure 4:
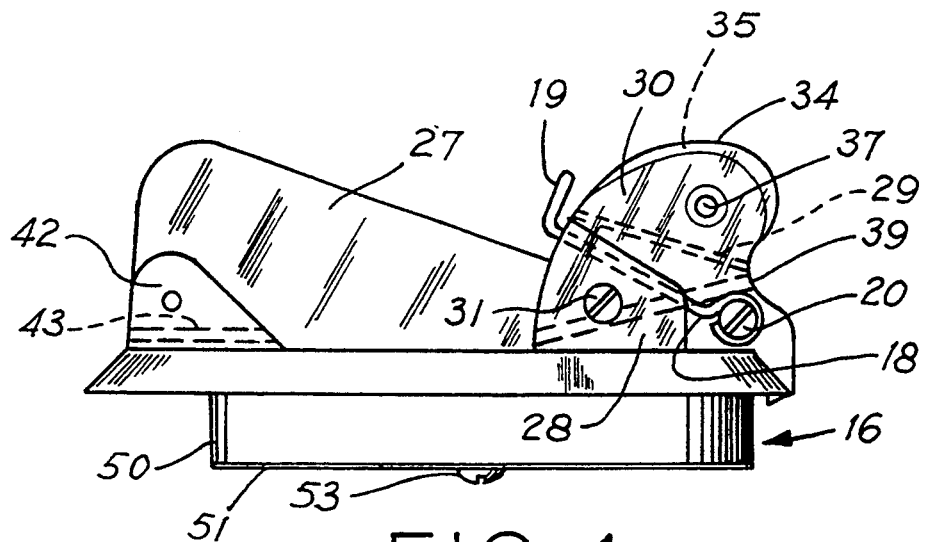
FIG. 4 is a right side elevational view of the diver showing the latch arm in latched condition but omitting the trolling line.

FIG. 1 shows the diver as it appears as it is being towed through the water on a trolling line 10 that would lead to the rod and reel aboard the trolling boat. The diver is shown as moving at an angle of about 75° relative to horizontal, but this is merely illustrative for the diver angle as will be explained subsequently. The fishing line 10 extending from the boat is threaded through appropriate passageways on the diver to allow for a portion 10A of the trolling line to extend toward the lure. A lure 13 having somewhat the appearance of a feather is associated with a fish hook 14 in FIG. 1.

As shown in FIG. 1, the diver comprises a planing member 15 having a flat bottom surface and a flat top surface on which there is an integral upstanding directional fin 27. A cylindrical chamber 16 is fastened to the bottom of planing member 15 and is rotatable relative to the bottom surface of the planing member about the axis of a screw 53 which mounts the cylindrical chamber to the bottom surface of the planing member 15. In FIG. 1, a latch arm 18, formed of wire, is shown in its latched position. Latch arm 18 has its free end bent to form an eye 19 through which the trolling line is threaded. Latch arm 18 is swingable freely about a screw 20 which serves as a pivot. The manner in which the latch arm 18 is secured in latched position as it is depicted in FIG. 1 and the manner in which the diver is gripped to the trolling line 10 to prevent it from sliding on the line until a fish strikes the lure will be elaborated next. If the fish line is tugged sharply from the boat the latch arm will also release to facilitate reeling in the diver and lure with little resistance because the planning member 15 will assume a horizontal attitude.

In FIG. 2, it is assumed that the fish 25 has struck the lure and is hooked. The pulling force of the fish creates tension in the trolling line, thereby causing the latch arm 18 to be unlatched and to pivot so as to assume the position in which it is shown in FIG. 2. As will be explained in more detail later, a strike by a fish as in FIG. 2 causes the frictional grip of the diver on the trolling line to be relieved. This permits the diver to slide along the trolling line 10 back to the lure.

Attention is now invited to FIG. 3 for a more detailed description of the diver. In this FIGURE, one may see that on the foreground side of fin 27 proximate to the leading end of planing member 15 there is a latching arm 18 and a flat clamping plate 28 molded integrally to the planning member and is bendable to a degree. The plate 28 is juxtaposed to an upstanding flat wall member 30. Plate 28 is capable of flexing toward and away from wall member 30 so as to provide a slot or gap 33 between them that can be entered by the length of the latching arm 18 to latch the arm releasably. A screw 31 has its head against the side of clamping plate 28 and its end is threaded in upright wall 30.

The upright wall 30 is also molded integrally with the top surface of planing member 15. Screw 31 can be tightened or loosened to change the force on the latch arm 18. The latching force required only needs to be sufficient to keep the latch arm 18 latched while the diver is being trolled. A tug on the line leading from the fishing rod causes the latch arm 18 to disengage and allows the planing member 15 to assume a more horizontal position in the water to make reeling the line in easier. The latching force on the latch arm 18 is adjusted using screw 31 in accordance with the trolling speed. That is, latching force depends on how fast the diver will be compelled to move through the water. When the diver is being towed through the water at high speed, it offers a greater reactive force so that the latching force must be increased by means of adjusting screw 31. If the diver is to be towed at a relatively low speed, only a low clamping force on latch arm 18 is needed. The gripping or clamping force on latch arm 18 does not depend on the expected size or pull of the fish. The latching force is adjusted so that at the contemplated trolling speed the latch arm 18 will not release until the tug of a fish occurs on line 10 or a tug from the rod on the boat which causes the latch to disengage and permits reeling in the diver and lure easily.

The top edge 32 of latch arm clamping plate 28 is beveled at so as to make it easier to insert latch arm 18 into the slot or gap 33 formed between deflectable plate 28 and upright wall 30. Gap 33 is more easily visualized in FIG. 6 where one may see that the gap 33 and, hence, latch arm 18 are aligned centrally with fin 27 so that the force exerted by the trolling line on the latch arm is directed through the center of the diver. The round cross-section latch arm 18 snaps into a shallow groove, not visible, formed in plate 28 and running parallel to the top edge 32 of plate 28 inside of the gap 33 when latch arm 18 is latched as it is in FIGS. 1, 4, 5 and 8. The groove provides a positive force rather than simply a frictional force and is coextensive with the part of latch arm 18 that resides between plate 28 and upright wall 30.

The diver must be releasably attached to trolling line 10 when the diver is being trolled through the water as is the case in FIG. 1. In accordance with the invention, the diver is attached to the line 10 in a manner that does not nick or dent the line as is the case in the preexisting patented diver which can slide along the trolling line. To provide for having the trolling line 10 releasably gripped by the diver, the diver is provided with a line 10 frictional gripping plate 34 that is used to define a line 10 wedging slot 35. Plate 34 is juxtaposed to an upstanding portion 36 of stationary wall 30. Gripping plate 34 is completely separate from wall 30 as can be seen best in FIG. 8 which shows a parting line 29. The other parts of the diver planing member 15 and the parts of its top surface are molded in one piece. A screw 37 that passes through an appropriate hole in gripping plate 34 and is threaded into upstanding fixed wall 30 provides for adjusting gripping plate 34 so it exerts some force on the line 10 for a particular line diameter. Gripping plate 34 is loosely fastened by screw 37 so the plate can wobble freely on the screw next to wall 30. Screw 37 is only adjusted before fishing is started to make sure that the particular fishing line 10 diameter can enter the slot or gap 35 and be wedged therein without the line going in so far as to bear on the threads of screw 37. In other words, it is only the width of the slot 35 that is varied with screw 37. The upper edge or entry edge of the line is marked 38. This edge 38 is beveled for making it easier to guide the trolling line into the slot 35 for seating the line until it wedges in the slot that is created by the slight tilt of plate 34 so that the diver cannot slide along the line until after the latch arm 18 is released.

FIG. 3 shows the trolling line 10 threaded through the eye 19 at the end of latch arm 18 and then into the slot or gap 35 between line gripping plate 34 and wall 30 as is also shown in FIG. 8 and other FIGURES. The line 10 loops around between the gripping plate 34 and stationary wall member 30 so that the line is seized and the diver cannot slide along the trolling line as long as arm 18 is latched as it is in FIG. 3. Note that the gripping force on the line between gripping plate 34 and wall portion 36 is distributed over a substantial length of line rather than being concentrated at a point on the line as is the case in the preexisting design. This prevents injury to the line.

The course of the trolling line 10 through the diver will now be described in greater detail. In FIG. 3 and in FIG. 8, one may see that there is a slanted hole 39 in the lower region of wall 30. After leaving frictional gripping slot 35, the line 10 passes through hole 39. The line, as can be seen in FIG. 3, then follows along the top surface of planing member 15 and finally exits from the diver through a hole 43 in some side plates 42 at the trailing end of planing member 15. The hole 43 is visible in several FIGURES including FIGS. 1, 2, 6 and 9. FIG. 3 shows most clearly how line 10 is threaded through holes 39 at the front end of the diver and hole 43 at the trailing end and then looped back between the clamping plate 34 and wall 30 and finally through the eye 19 of latch arm 18. Holes 39 and 43 and the elements 30 and 42 through which the holes pass constitute guide means for supporting the diver when the latch arm 18 becomes unlatched and line 10 pulls out of the slot 35 on one side of gripping plate 34. The user will guide the line into the slot 35 between the wall 30 and plate 34 and then set the latch arm 18 into its slot 32. Before the diver is put into the water, it is also appropriate to grasp line portions 10 and 10A and exert tension on them to determine how much force might be required to pull the latch arm out of its gap or slot 33. This force is set with adjustment screw 31.

Figure 5:
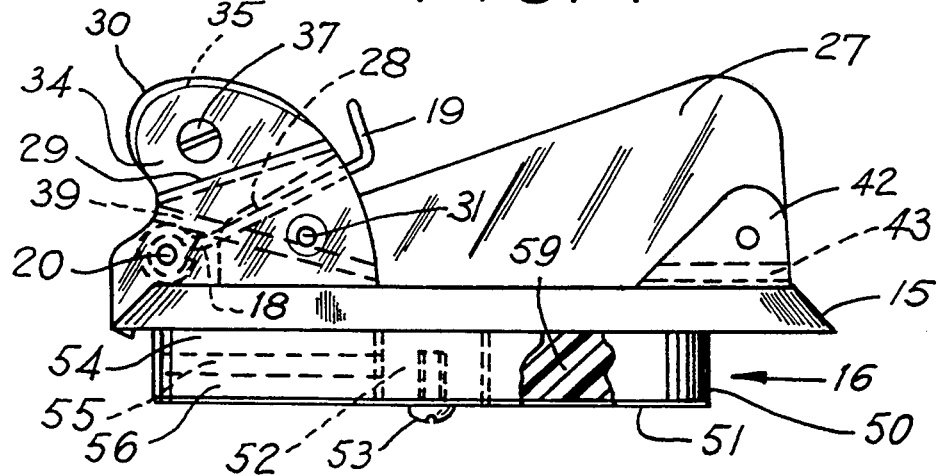
FIG. 5 is a left side elevational view of the diver with a part broken away to show the interior of the cylindrical chamber which contains the balancing weight arranged at the leading end of the diver beneath the planing member and in the cylindrical chamber.
Figure 6:
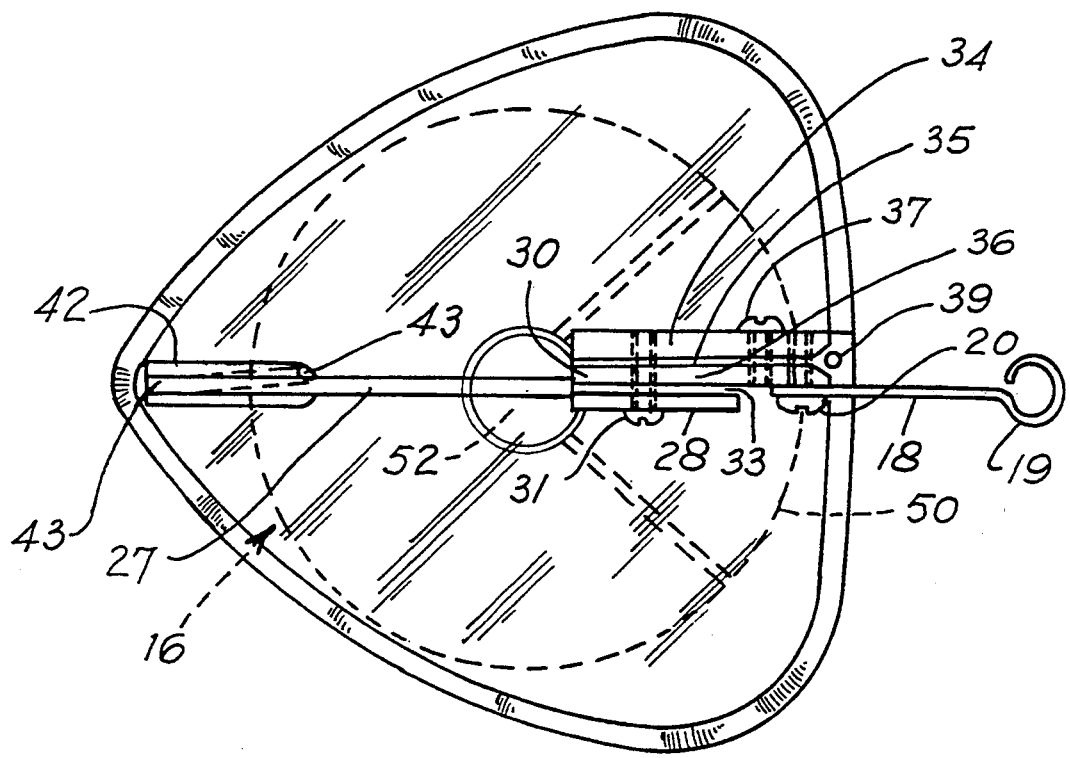
FIG. 6 is a top plan view of the diver.
Figure 7:
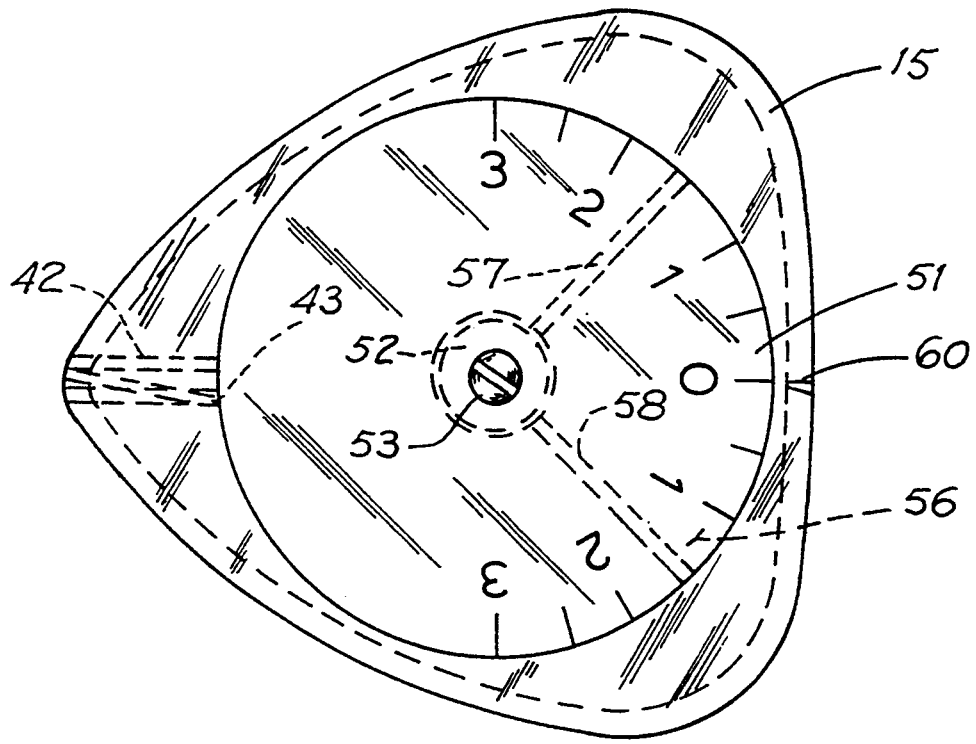
FIG. 7 is a bottom plan view of the diver.

Attention is now invited to FIGS. 5 and 7, in particular, for a discussion of the contents and function of the cylindrical buoyancy chamber 16. The base chamber 16 is comprised of a circular side wall 15, defining an open top cylinder, and a bottom disk 51. As can be seen in FIGS. 5, 6 and 7 particularly well, a cylindrical post 52 is preferably molded integrally to the bottom surface of diver planing member 10 or it can be a separate block or cylinder that is adhered to the bottom of the planing member 15. The cylindrical chamber 16 is held to the bottom surface of planing member 15 by means of a screw 53 which threads into post 52. This provides for the chamber being rotatable through a limited angle about the screw 53. The screw 53 can be tightened sufficiently to frictionally hold the cylindrical chamber 16 in position and preventing rotational slipping.

A sector of the space inside of the chamber defined by ribs 57 and 58 is occupied by a weight which, in this example, is comprised of three lead layers 54, 55 and 56 which have the configuration of a sector of a circle having radially extending edges 57 and 58 as shown in FIG. 7. The remaining space around the sector shaped lead weight layers is occupied by a disk comprised of a water repellant foam resin disk 59 which may be polystyrene, for example. The foam resin disk 59 is secured in a fixed position by the partition ribs 57 and 58. The cylinder can be rotated to align the median radius of the weight sectors at various angles relative to the fin 27. It is known in the art, as illustrated in the patents cited herein, to provide a weight below the planing member of a diver at the leading end. According to prior practice, however, the weight has been made in a single piece. Making the weight in several layers, in accordance with one feature of the invention, allows some control over the action of the diver. The lead weight is not added to the diver for the purpose of making the diver submerge deeper. The weight is used primarily for making the cylindrical base more stable. Fin 27 controls the direction of the dive, not only downwardly, but also to the side. It is really due to adjusting the weight sectors at an angle relative to the straight fin that makes the diver move in or out from the trolling boat. In accordance with the invention, cylindrical chamber 16 is preferably large enough to provide a diver that has a total volume relative to its weight that will increase its buoyancy so that if the fish line breaks, the diver will float to the surface. The cylinder could be empty, but, in accordance with this design, using the rigid foam disk 59 provides for keeping water out of the cylinder.

As implied, the position of the diver to the side of the trolling boat relative to the line along which the boat is moving is governed by the angle to which the weights 54-56 are rotated relative to a vertical plane passing through the center line of the fin. If the weight is moved to the right of the fin as viewed from the top front end of the diver in FIG. 6, for example, by turning the cylinder 16, the diver will move to the left. If the weight is moved to the left of the fin as viewed in FIG. 6, the diver will move to the right when it is being towed through the water. The benefit of being able to control the position of the diver is that several fish lines can be run out from the boat, all at the same depth because they are all being towed at the same speed, without a line tangling with any other line running from the boat. The angle of rotation of the lead weight, thus, will cause a plurality of divers on lines extending from the boat to station at different distances from the boat. In this way, the several fishing lines extending from the boat can cause the divers on them to sweep through a larger area and thereby increase the probability of getting a fish to strike. The fisherman know how much line they should let out from their reels to have the various divers and lures at different distances from the boat.

As evidenced in FIG. 7, angular graduations 0–7 are printed or engraved on the bottom of cylindrical chamber 16 to apprise the user of the angle at which the weights are set by viewing the scale relative to an index mark 60 on the bottom of a planing member 15.

The manner in which the improved diver is used will now be recapitulated. If for instance, it is expected during preparation for fishing that the trolling boat will travel at a fairly high speed in view of the depth at which fish are expected to be feeding on a particular day, all of the weight layers 54-56 will be allowed to remain in chamber 16. On the other hand, if slow trolling is expected as would be the case when it is desired to position the divers at a lesser depth in the water, one or more of the weights 54-56 may be removed. As previously indicated, however, the weights are not used to cause the diver to sink for this is the function of the speed at which the diver is pulled through the water and the result of the line 10 passing through the eye 19 of clamp arm 18 set back from the leading end of the planing member 15. The trolling line with nothing attached to its end before the diver is set in the water, will be inserted through the eye 19 of latch arm 18 with the latch arm 18 released as is the case in the FIG. 2 illustration of the diver. The line can then be threaded through the slanted hole 39 at the front end of the diver and fed along the side of fin 27 for being passed through hole 43 at the trailing end of the diver. With the free end of the trolling line now available at the trailing end of the diver, the lure 13 and hook 14 may be attached to the trolling line. Either, before or after this event, latch arm 18 may be swung into latch position as it is in FIGS. 1, 3, 4 and 5, for example. Line 10 can be drawn into slot 35 which is defined between gripping plate 34 which may be readjusted with screw 37 to accommodate and cause wedging of the particular size fishing line that is being used at the time. As previously indicated, the line is wedged and gripped in the slot between plate 34 and the upstanding wall 30 over a significant length of the line so that the unit forces on the line are distributed, rather than being concentrated. This results in avoidance of imparting any nicks or distortion to the line which would make it more vulnerable to breaking. Besides distributing the wedging or frictional force over a substantial length of the line in the diver, the diver is further distinguished by using a weight that is composed of lead laminations so as to provide for using all or some of them to control stability of the diver.

When the latch arm 18 unlatches due to tension on the line 10 caused by a fish striking the lure, for example, the line is free to pull out of the slot 35 wherein it is frictionally wedged so the diver is set free to slide on the line toward the lure at the end of the line as the line is reeled in to land the fish.

I claim:

1. A diver for use on a line for trolling a fish lure at the end of the line from a boat, the diver comprising:

a generally planar planing member and guide means for guiding the planing member to provide for the planing member being supported to slide on the trolling line between where the line originates on the boat and the lure, a latching arm having a free end containing an opening for the line to pass through and an opposite end adapted for pivoting the arm on the planing member between latched and unlatched positions, latching means for releasably latching the latch arm in said latched position, an element fixed relative to the planing member and having a planar surface fixed relative to the said planing member and an adjustably movable gripping plate having a planar surface arranged adjacent the fixed element with the planar surface of the gripping plate facing the planar surface of the fixed element to define a slot between them to provide for a length of the trolling line to be wedged in and frictionally gripped in the slot to prevent the diver from sliding on the line during trolling while said latch arm is latched, said line when gripped in said slot and passing through said opening in the free end of the latch arm and supported by said guide means responding to a sudden increase in the tension in the trolling line by causing said latch arm to unlatch and pivot to allow said length of line to be released from said slot so the diver becomes supported on said guide means and on said opening in the latch arm for sliding on the line.

2. The diver according to claim 1 including an adjustment screw passing through said adjustably movable gripping plate and threaded into said fixed element, for adjusting the size of the slot between said facing surfaces to provide for trolling lines of different diameters being grippable in the slot.

3. The diver according to claim 1 wherein said element stands upwardly from the planing member and an upper portion of the element containing the planar surface that defines one side of the slot has a lower portion below said slot in which lower portion there is a guide hole through which the line is threaded to extend along part of the length of the planing member to serve as one part of said guide means for the line, and a fin extending from said planing member and having a widened portion spaced from said guide hole and having a guide hole through which the line is threaded to serve as another part of the guide means, the spacing between the guide holes providing for the line to run in the open between said guide holes to facilitate threading the line through the guide holes.

4. A diver for use on a fish trolling line having a lure at the end of the line, the diver comprising:

a generally planar planing member having leading and trailing ends, guide means on said planing member for supporting the diver for sliding on the line, a latch arm having one end pivotally connected to said planing member proximate to said leading end and an opposite end having an opening for the line to pass through, latch means for releasably latching said latch arm when said arm is pivoted toward said trailing end of the planing member to form an acute angle between the planing member and latch arm, line gripping means mounted to said planing member adjacent the latch arm for releasably engaging the diver to the line to prevent the diver from sliding on the line until the latch arm is released, said gripping means comprising an upstanding element with a planar surface mounted to the planing member and a plate member having a planar surface and mounted to said upstanding element with the planar surface of the element and the planar surface of the plate facing each other to define a slot for a length of the line to pass through for being frictionally gripped in the slot, the line while supported on the guide means when the latch arm is latched passing through said opening of the latch arm and through said slot such that when there is a sudden increase in the line tension said latch arm releases and pivots to allow the line to pull out of the frictionally engaging slot so the diver can slide on the line.

5. The diver according to claim 4 wherein said plate member of the line gripping means is mounted to said upstanding member with an adjustment screw that passes through the plate member with clearance and is threaded into the upstanding member.

6. The diver according to any one of claims 1 or 4 including a chamber having an interior Space, the chamber mounted to said planing member for being rotatable relative to the planing member about an axis normal to the planing member,
 a weight arranged in said chamber occupying one part of the space and rotatable with the chamber to provide for controlling the direction of the diver when it is being drawn through the water.

7. The device according to claim 6 wherein said weight is composed of removable and replaceable layers of metal.

8. The diver according to claim 6 wherein a part of the space in the chamber not occupied by the weight is occupied by a water repellant material.

9. The diver according to claim 8 wherein the water repellant material is a rigid foam.

10. The diver according to claim 6 wherein said chamber is a cylinder having an open end interfaced with said planing member and an opposite closed end, the chamber being mounted to said planing member for being turned thereon about the axis of the cylinder,
 a water repellant member in the chamber for turning with the cylindrical chamber.

11. A diver for use on a fish trolling line having a lure on the end of the line, comprising:
 a planing member having top and bottom surfaces and leading and trailing end,
 a latch arm engaged by the trolling line pivotally connected to the top surface of the planing member proximate to said leading end,
 a latch member providing an elongated slot and extending obliquely toward the trailing end of the planing member for receiving and releasably holding said latch arm which causes the planing member to assume an angle relative to the trolling line to cause said planing member to dive as it is drawn through the water,
 a cylindrical chamber providing for increasing the stability of the diver, said chamber having a circular wall open at one end and a closure disk at the opposite end,
 means for mounting the cylindrical chamber to said planing member for turning about the cylinder axis with the open end of the circular wall interfaced with said bottom surface of the planing member,
 a weight occupying a section of the space inside the cylindrical chamber for turning adjustably with the cylindrical chamber for controlling the direction taken by the diver when it is being trolled.

12. The diver according to claim 11 wherein the space in the chamber not occupied by the weight is occupied by a low density water repellant material.

13. The diver according to claim 11 wherein the space in the chamber not occupied by the weight is occupied by a water repellant foamed resin.

14. The diver according to any one of claims 11, 12 or 13 wherein said weight is composed of a plurality of removable and replaceable metal layers.

* * * * *